(12) United States Patent
Fraser (10) Patent No.: US 10,831,868 B2
(45) Date of Patent: Nov. 10, 2020

(54) GLOBAL LICENSE SPANNING MULTIPLE TIMEZONES IN A RATE-BASED SYSTEM

(71) Applicant: International Business Machines Corporation, Armonk, NY (US)

(72) Inventor: Christopher C. Fraser, Noonan (CA)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 15/943,628

(22) Filed: Apr. 2, 2018

(65) Prior Publication Data

US 2019/0303542 A1 Oct. 3, 2019

(51) Int. Cl.
*G06F 21/10* (2013.01)
*H04L 12/26* (2006.01)
*H04W 4/02* (2018.01)

(52) U.S. Cl.
CPC ............ *G06F 21/105* (2013.01); *H04L 43/08* (2013.01); *H04W 4/025* (2013.01)

(58) Field of Classification Search
CPC .......... G06F 21/105; G06F 2221/2111; G06F 21/10; H04L 43/08; H04L 43/0894; H04W 4/025; H04W 4/02
See application file for complete search history.

(56) References Cited

U.S. PATENT DOCUMENTS

| | | | |
|---|---|---|---|
| 6,502,079 B1 | 12/2002 | Ball et al. | |
| 7,707,115 B2* | 4/2010 | Goringe | G06Q 10/10 705/59 |
| 8,516,090 B1* | 8/2013 | Welch | G06F 21/10 709/221 |
| 9,811,644 B1* | 11/2017 | Ahmed | H04W 4/021 |
| 9,922,176 B2* | 3/2018 | Shetty | G06F 16/13 |
| 2001/0034712 A1 | 10/2001 | Colvin | |
| 2003/0103528 A1 | 6/2003 | Kawaguchi et al. | |
| 2004/0260589 A1* | 12/2004 | Varadarajan | G06Q 10/0631 705/7.18 |
| 2009/0299791 A1* | 12/2009 | Blake | G06Q 10/06 705/40 |
| 2012/0136998 A1* | 5/2012 | Hough | G06F 21/10 709/225 |
| 2012/0159611 A1* | 6/2012 | Stearns | G06F 21/105 726/18 |
| 2013/0159128 A1* | 6/2013 | Koutsoyannopoulos | G06Q 10/06 705/26.2 |
| 2013/0191923 A1* | 7/2013 | Abuelsaad | G06F 21/10 726/26 |
| 2013/0262250 A1* | 10/2013 | Lingafelt | G06Q 30/06 705/26.1 |

(Continued)

*Primary Examiner* — Matthew Smithers
(74) *Attorney, Agent, or Firm* — Terrile, Cannatti & Chambers, LLP; Michael Rocco Cannatti (57) ABSTRACT

A method, system, apparatus, and a computer program product are provided for managing a rate-based license by monitoring geographic location information for each of a plurality of users in different time zones and adjusting allocations of an application license for a user organization across the plurality of users based on the geographic location information for the plurality of users and an amount of the application license expected to be used during specified peak hours at each geographic location so that the application license is allocated to permit each usage for each user during the specified peak hours at each geographic location.

20 Claims, 5 Drawing Sheets

(56) References Cited

U.S. PATENT DOCUMENTS

| | | | |
|---|---|---|---|
| 2014/0193546 A1* | 7/2014 | Vigneri | A23G 1/0076 |
| | | | 426/93 |
| 2014/0223570 A1* | 8/2014 | Matsushima | G06F 21/105 |
| | | | 726/26 |
| 2014/0304784 A1* | 10/2014 | Harrison | H04L 63/0492 |
| | | | 726/5 |
| 2016/0092887 A1* | 3/2016 | Jagad | G06Q 30/018 |
| | | | 705/59 |
| 2016/0267257 A1* | 9/2016 | Wisgo | G06F 21/105 |
| 2017/0083955 A1 | 3/2017 | Davis et al. | |
| 2017/0083986 A1* | 3/2017 | Davis | G06Q 30/0283 |
| 2017/0318083 A1* | 11/2017 | Ignatyev | H04L 67/306 |
| 2018/0225729 A1* | 8/2018 | Li | G06Q 30/0283 |

\* cited by examiner

GLOBAL LICENSE SPANNING MULTIPLE TIMEZONES IN A RATE-BASED SYSTEM

BACKGROUND OF THE INVENTION

Field of the Invention

The present invention relates in general to the field of computer software licensing. In one aspect, the present invention relates to a software-based method, system and computer-usable medium for managing rate-based licenses.

Description of the Related Art

Because organizations are increasingly exposed to a greater volume and variety and sophistication of attacks, security functionality should be used to help detect and defend against threats by applying sophisticated analytics to more types of data and to identify high-priority incidents that might otherwise get lost in the noise of the overall operation of a large scale information processing environment. For example, it is known to provide security functionality to IT environments via security intelligence platforms which integrate security information and event management (SIEM), log management, anomaly detection, vulnerability management, risk management and incident forensics into a unified solution. One issue associated with large scale IT platforms, such as security intelligence platforms, relates to license maintenance and accounting. With certain large scale security systems, licenses are based upon a number of events using the system over a certain amount of time. In these systems where a large number of license events can occur at event processor sites which are distributed in different time zones and locations, license misallocations can arise. For example, a user in a specified time zone who is operating under a static rate-based license system may be under-utilizing the license during non-peak times, and may be over-utilizing the license during peak hours. Accordingly, there are drawbacks to conventional solutions since users of the rate-based system must acquire a larger license than is required for their global deployment of the system. As a result, the existing solutions for efficiently managing a rate-based license to globally distributed users are extremely difficult at a practical level.

SUMMARY

Broadly speaking, selected embodiments of the present disclosure provide a system, method, computer program product, and apparatus for managing rate-based licenses for non-centralized applications that are that applied at distributed nodes used in different time zones by configuring an information handling system to allow users of the rate-based system to define the physical location and/or time zone and where each component of the rate-based system is located, as well as a rate peak time (e.g., start and end times) within that time zone so that portions of the license rate may be programmatically allocated to each component of the system. In this arrangement, users of the information handling system may optimize the amount of license they are required to use at each component so as to allocate a fixed rate license among the components with larger license allocations for individual components of the rate-based system during peak hours of the day (e.g., normal business hours, etc.) to handle larger rates at such times, and with smaller license allocations for individual components during off-peak hours to handle smaller rates at such times. In selected embodiments, the information handling system is configured to continuously shift respective allocations of a license for a user organization across users based on respective geographic locations of the users and an amount of the license expected to be used during peak hours at a respective geographic location so that the license is being used optimally based on peak hours of the rate-based licensing application. In this way, a rate-based system, which spans across multiple time zones where the license application is not centralized, can dynamically shift and proportionally adjust the allocation of the license based on the geographic location and the amount of the license expected to be used at that specific time. Examples of applications or systems that may value from this type of a solution include any cloud based offering where the systems are distributed throughout the world in multiple time zones.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

A method, system, apparatus, computer program product, and apparatus are provided for operating a rate-based licensing application that is not centralized and spans across multiple time zones. As disclosed, the system enables a user to optimize the amount of license they are required to use by specifying the physical location or time zone and the rate peak time(s) where each part of the system is located, and then automatically balances the license rate allocations to each part of the system using a default or user-specified allocation so that larger rates through the system can be optimally handled during peak times in the relevant location/time zone(s). In selected embodiments, a micro service may be used to interact with components in the rate-based system via application programmable interfaces (APIs) which use a data storage system of relational database to store configuration metadata and to conduct the license rate changes throughout the system.

Figure 1:
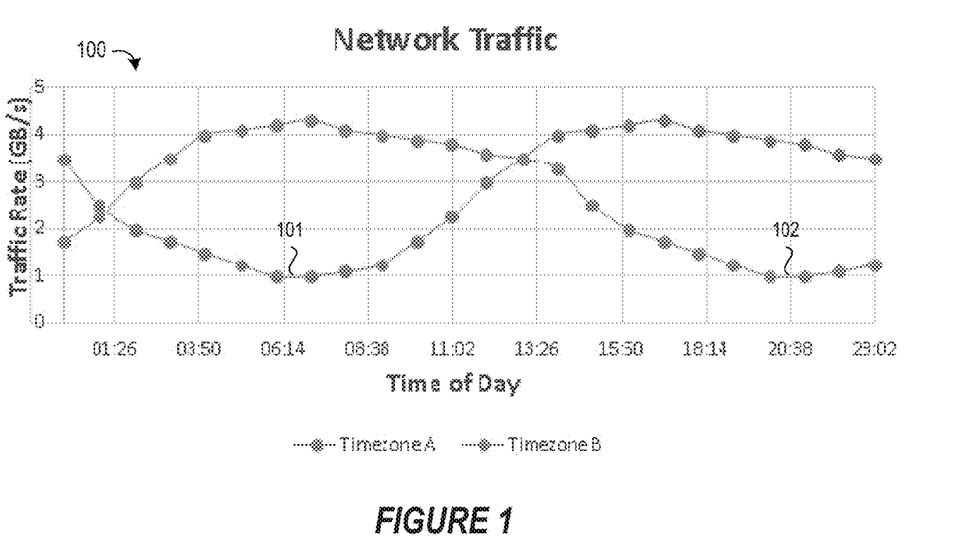
FIG. 1 depicts network traffic activity for users in different time zones.

To provide a contextual understanding for selected embodiments of the present disclosure, reference is now made to FIG. 1 which shows a diagrammatic depiction 100 of network traffic activity for users in two different time zones. The network activity of a first user in Time Zone A 101 shows that the traffic rate (indicated with GB/s) varies over the course of the day, reaching a minimum amount of traffic at approximately 6:14 hours, and then increasing until reaching a peak between 15:50 and 18:14 hours. However, the network activity is different for the second user in Time Zone B 102, with the traffic rate (indicated with GB/s) reaching a peak amount of traffic shortly after 6:14 hours, and then decreasing until reaching a minimum amount of traffic at approximately 20:38 hours. As shown in FIG. 1, a conventional approach for licensing a rate-based system to handle the peak traffic rate for a first user in Time Zone A 101 (e.g., at the interval from 13:36 to 20:38 hours) will result in periodic intervals (e.g., at the interval from 1:26 to 11:02 hours) when the provisioned license rate is not being fully used.

Figure 2:
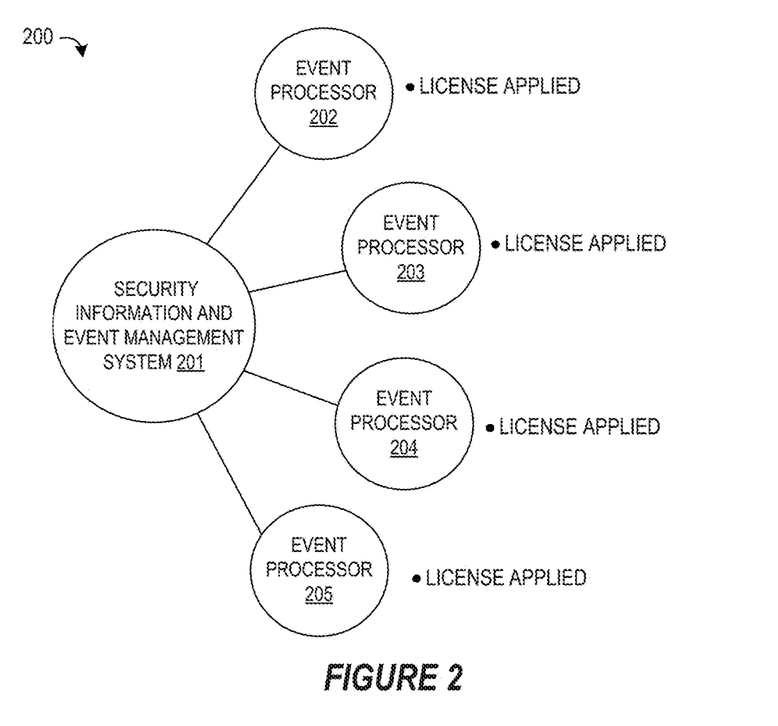
FIG. 2 depicts a system diagram of a security information and event management system in which license rights are applied to distributed nodes located in different locations or time zones.

In a rate-based system spanning multiple time zones where the license application is not centralized, selected embodiments of the present disclosure provide a system for dynamically shift and proportionally adjust the license rights based on the geographic location and the amount of the license expected to be used at that specific time. Examples of applications or systems that may benefit include any cloud-based offering where the systems are distributed throughout the world in multiple time zones. To provide additional details for an improved understanding of selected embodiments of the present disclosure, reference is now made to FIG. 2 which diagrammatically depicts a rate-based system 200 in which a security information and event management system 201 applies license rights to distributed nodes 202-205 located in different locations or time zones. For example, IBM's QRadar security information and event management (SIEM) system 201 has event processor nodes 202-205 placed throughout the world in multiple time zones that all follow similar network traffic patterns throughout the day, albeit shifted in time. In this scenario, the user of the product may have an allocated SIEM license that is being over-utilized at an event processor (e.g., 202) in one time-zone and underutilized at another event processor (e.g., 205) in another time-zone. To address this scenario, the SIEM license for the event processor nodes 202-205 may be individually allocated as rate-limited licenses at each node that shift over time or location for each node so that the individual licenses all add up to 100% of the SIEM license while shifting the license allocations to handle larger rates during peak hours for each given node.

As disclosed herein, the rate-based system, method, and/or a computer program product may be implemented with an information handling system which may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, selected embodiments may take the form of computer program product embodied in a computer readable storage medium (or media) having computer readable program instructions thereon for causing a processor to carry out aspects of the present invention. Thus embodied, the disclosed system, a method, and/or a computer program product is operative to improve the functionality and operation of a computer system by efficiently allocating license rights to globally distributed users to solve the problem where license is being under-utilized during non-peak times, and over utilized during peak hours of the rate-based system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. In the context of this disclosure, a computer-usable or computer-readable medium may be any medium that can contain, store, communicate, or transport the program for use by or in connection with the instruction execution system, apparatus, or device. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code for carrying out operations of the present invention may be written in an object oriented programming language such as Java. Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the present disclosure are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
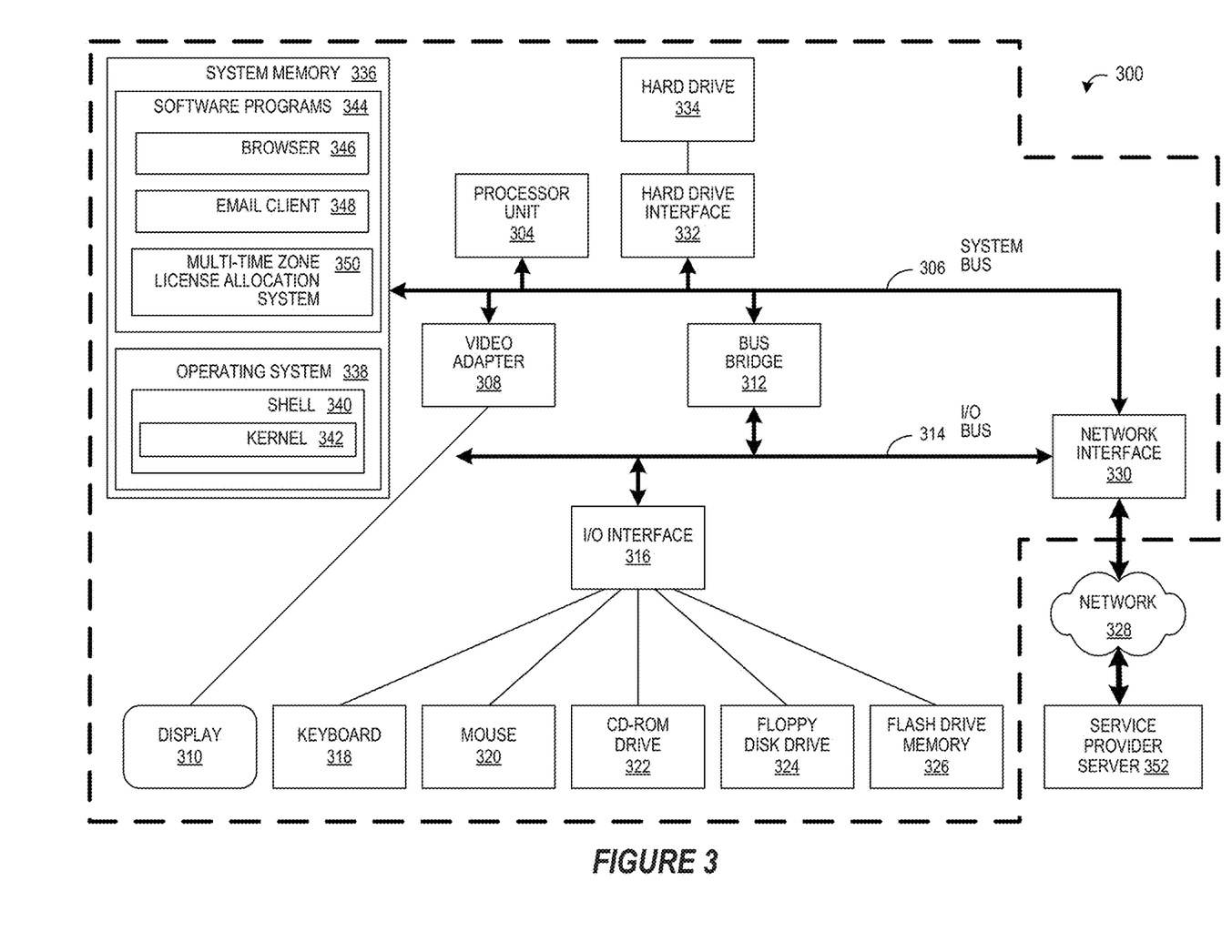
FIG. 3 is a block diagram of a processor and components of an information handling system in accordance selected embodiments of the present disclosure.

Referring now to FIG. 3, there is depicted is a block diagram of an exemplary computer 300 in which the present invention may be utilized. Computer 300 includes one or more processor units 304 that are coupled to a system bus 306. A video adapter 308, which controls a display 310, is also coupled to system bus 306. System bus 306 is coupled via a bus bridge 312 to an Input/Output (I/O) bus 314. An I/O interface 316 is coupled to I/O bus 314. The I/O interface 316 affords communication with various I/O devices, including a keyboard 318, a mouse 320, a Compact Disk-Read Only Memory (CD-ROM) drive 322, a floppy disk drive 324, and a flash drive memory 326. The format of the ports connected to I/O interface 316 may be any known to those skilled in the art of computer architecture, including but not limited to Universal Serial Bus (USB) ports.

Computer 300 is able to communicate with a service provider server 352 via a network 328 using a network interface 330, which is coupled to system bus 306. Network 328 may be an external network such as the Internet, or an internal network such as an Ethernet Network or a Virtual Private Network (VPN). Using network 328, computer 300 is able to use the present invention to access service provider server 352.

A hard drive interface 332 is also coupled to system bus 306. Hard drive interface 332 interfaces with a hard drive 334. In selected embodiments, hard drive 334 populates a system memory 336, which is also coupled to system bus 306. Data that populates system memory 336 includes the computer's 300 operating system (OS) 338 and software programs 344.

OS 338 includes a shell 340 for providing transparent user access to resources such as software programs 344. Generally, shell 340 is a program that provides an interpreter and an interface between the user and the operating system. More specifically, shell 340 executes commands that are entered into a command line user interface or from a file. Thus, shell 340 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 342) for processing. While shell 340 generally is a text-based, line-oriented user interface, the present invention can also support other user interface modes, such as graphical, voice, gestural, etc.

As depicted, OS 338 also includes kernel 342, which includes lower levels of functionality for OS 338, including essential services required by other parts of OS 338 and software programs 344, including memory management, process and task management, disk management, and mouse and keyboard management. Software programs 344 may include a browser 346 and email client 348. Browser 346 includes program modules and instructions enabling a World Wide Web (WWW) client (i.e., computer 300) to send and receive network messages to the Internet using HyperText Transfer Protocol (HTTP) messaging, thus enabling communication with service provider server 352. In various embodiments, software programs 344 may also include a multi-time zone license allocation system 350. In these and other embodiments, the multi-time zone license allocation system 350 includes code for implementing the processes described hereinbelow. In one embodiment, computer 300 is able to download the multi-time zone license allocation system 350 from a service provider server 352.

The hardware elements depicted in computer 300 are not intended to be exhaustive, but rather are representative to highlight components used by the present invention. For instance, computer 300 may include alternate memory storage devices such as magnetic cassettes, Digital Versatile Disks (DVDs), Bernoulli cartridges, and the like. These and other variations are intended to be within the spirit, scope and intent of the present invention.

Figure 4:
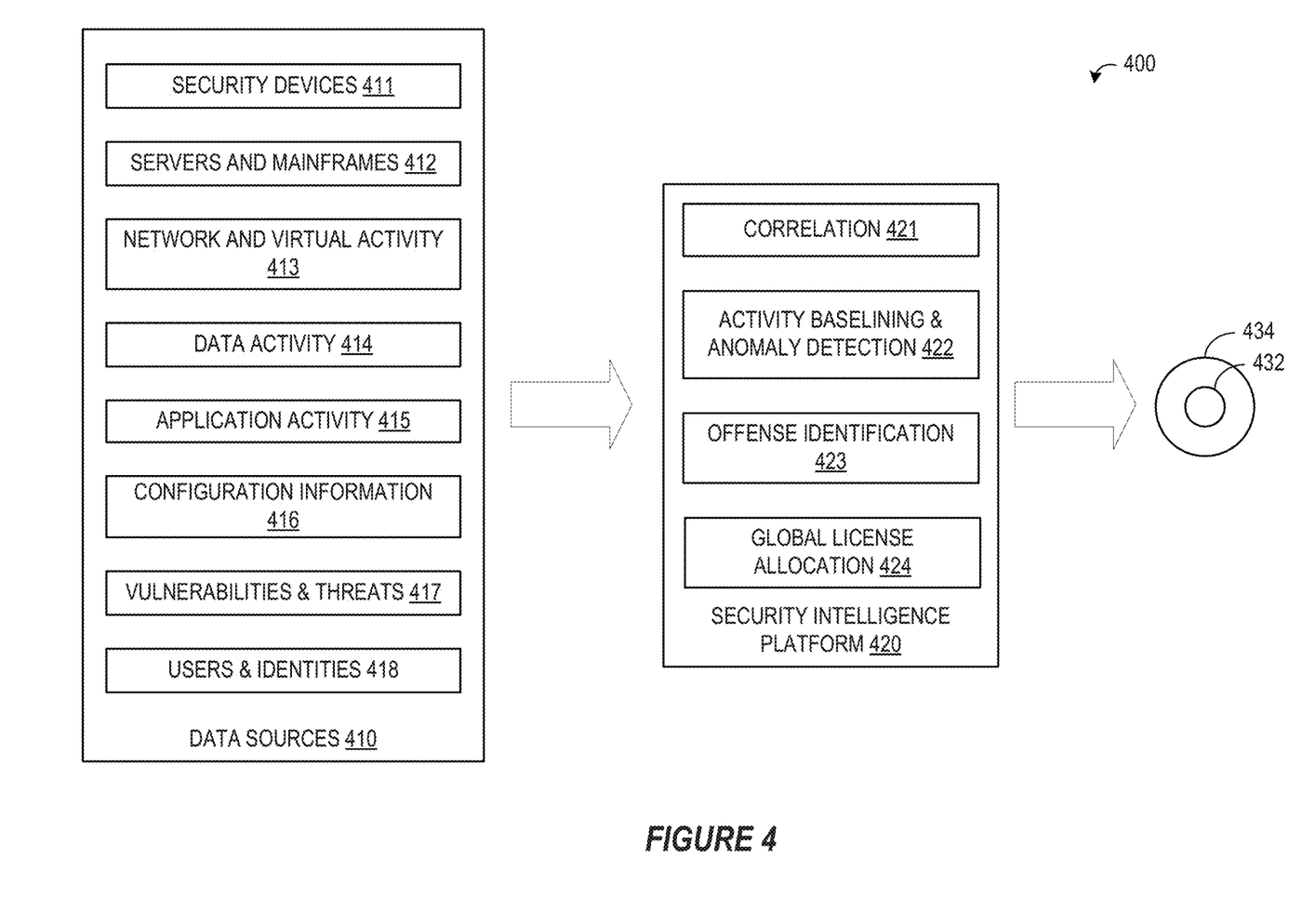
FIG. 4 depicts a simplified block diagram of a security intelligence platform in accordance selected embodiments of the present disclosure.

Turning now to FIG. 4, there is shown a simplified block diagram of a security intelligence environment 400 which includes a security intelligence platform 420 in accordance with various aspects of the present disclosure. The security intelligence platform 420 integrates security information and event management (SIEM), log management, anomaly detection, vulnerability management, risk management and incident forensics into a unified solution. By using intelligence, integration and automation to provide 360-degree security insight, the security intelligence platform 420 delivers threat detection, ease of use and lower total cost of ownership. The security intelligence platform 210 uses intelligence, integration and automation to deliver security and compliance functionality.

The security intelligence platform 420 receives information from one or more of a plurality of data sources 410 and performs one or more of correlation operations, activity baselining and anomaly detection operations, offense identification operations to provide an identification of a true offense 432 as well as identification of suspected intendents 434 as well as a global license allocation management system. In certain embodiments, the security intelligence platform 420 includes one or more of an integrated family of modules that can help detect threats that otherwise would be missed. For example, in certain embodiments, the family of modules can include a correlation module 421 for performing the correlation operations, an activity baselining and anomaly detection module 422 for performing the activity baselining and anomaly detection operations, an offence identification module 423 for performing the offence identification operation, and a global license allocation system 424. In various embodiments, the multi-time zone license allocation system 350 performs one or more global license allocation functions 424.

In various embodiments, the correlation operation includes one or more of logs/events analysis, flow analysis, IP reputation analysis and geographic location analysis. In various embodiments, the activity baselining and anomaly detection operation includes one or more of user activity analysis, database activity analysis, application activity analysis and network activity analysis. In various embodiments, the offense identification operation includes one or more of credibility analysis, severity analysis and relevance analysis. In various embodiments, global license allocation operations of the system security intelligence platform 420 programmatically allocate proportions of a license rate to each event processor node.

The plurality of data sources 410 can include one or more of security devices 411, servers and mainframes 412, network and virtual activity data sources 413, data activity data sources 414, application activity data sources 415, configuration information data sources 416, vulnerabilities and threats information data sources 417, as well as users and identities data sources 418.

The security intelligence platform 420 helps detect and defend against threats by applying sophisticated analytics to the data received from the plurality of data sources. In doing so, the security intelligence platform 420 helps identify high-priority incidents that might otherwise get lost in the noise of the operation of a large scale information processing environment. The security intelligence platform 420 uses some or all of the integrated family of modules 421-424 to solve a number of business issues including consolidating data silos into one integrated solution; identifying insider theft and fraud; managing vulnerabilities, configurations, compliance and risks; conducting forensic investigations of incidents and offenses; and, addressing regulatory mandates.

In various embodiments, the security intelligence platform 420 provides a plurality of functions. For example, in certain embodiments, the security intelligence platform 420 consolidates data silos from a plurality of data sources. More specifically, while a wealth of information exists within organizations operating large scale information processing systems such as log, network flow and business process data, this information is often held in discrete data silos. The security intelligence platform 420 converges network, security and operations views into a unified and flexible solution. The security intelligence platform breaks down the walls between silos by correlating logs with network flows and a multitude of other data, presenting virtually all relevant information on a single screen. Such a correlation helps enable superior threat detection and a much richer view of enterprise activity.

Additionally, in various embodiments, the security intelligence platform performs an insider fraud detection operation. Some of the gravest threats to an organization can come from the inside the organization, yet organizations often lack the intelligence needed to detect malicious insiders or outside parties that have compromised user accounts. By combining user and application monitoring with application-layer network visibility, organizations can better detect meaningful deviations from normal activity, helping to stop an attack before it completes.

Additionally, in various embodiments, the security intelligence platform 420 predicts and remediates risk and vulnerabilities. Security, network and infrastructure teams strive to manage risk by identifying vulnerabilities and prioritizing remediation before a breach occurs. The security intelligence platform 420 integrates risk, configuration and vulnerability management with SIEM capabilities, including correlation and network flow analytics, to help provide better insight into critical vulnerabilities. As a result, organizations can remediate risks more effectively and efficiently.

Additionally, in various embodiments, the security intelligence platform 420 can conduct forensics analysis. In certain embodiments, the security intelligence platform 420 includes integrated incident forensics helps IT security teams reduce the time spent investigating security incidents, and eliminates the need for specialized training. The security intelligence platform 420 expands security data searches to include full packet captures and digitally stored text, voice, and image documents. The security intelligence platform helps present clarity around what happened when, who was involved, and what data was accessed or transferred in a security incident. As a result, the security intelligence platform 420 helps remediate a network breach and can help prevent it from succeeding again.

Additionally, in various embodiments, the security intelligence platform 420 addresses regulatory compliance mandates. Many organizations wrestle with passing compliance audits while having to perform data collection, monitoring and reporting with increasingly limited resources. To automate and simplify compliance tasks, the security intelligence platform 420 provides collection, correlation and reporting on compliance-related activity, backed The security intelligence platform 420 leverages easier-to-use security analytics. More specifically, the security intelligence platform 420 provides a unified architecture for storing, correlating, querying and reporting on log, flow, vulnerability, and malevolent user and asset data. The security intelligence platform 420 combines sophisticated analytics with out-of-the-box rules, reports and dashboards. While the platform is powerful and scalable for large corporations and major government agencies, the platform is also intuitive and flexible enough for small and midsize organizations. Users benefit from potentially faster time to value, lower cost of ownership, greater agility, and enhanced protection against security and compliance risks.

The security intelligence platform 420 provides advanced intelligence. More specifically, by analyzing more types of data and using more analytics techniques, the platform can often detect threats that might be missed by other solutions and help provide advanced network visibility.

The security intelligence platform 420 also provides advanced integration. Because the security intelligence platform includes a common application platform, database and user interface, the platform delivers massive log management scale without compromising the real-time intelligence of SIEM and network behavior analytics. It provides a common solution for all searching, correlation, anomaly detection and reporting functions. A single, intuitive user interface provides seamless access to all log management, flow analysis, incident management, configuration management, risk and vulnerability management, incident forensics, dashboard and reporting functions.

The security intelligence platform 420 also provides advanced automation. More specifically, the security intelligence platform 420 is simple to deploy and manage, offering extensive out-of-the-box integration modules and security intelligence content. By automating many asset discovery, data normalization and tuning functions, while providing out-of-the-box rules and reports, the security intelligence platform 420 is designed to reduce complexity of the operation of the platform.

Figure 5:
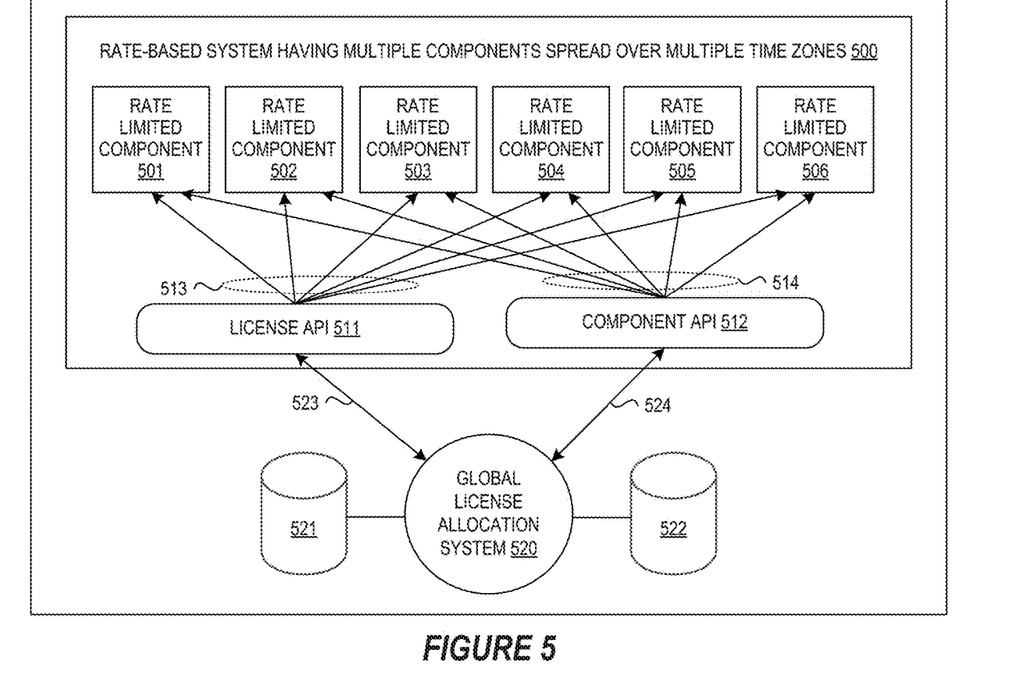
FIG. 5 depicts a simplified block diagram of a rate-based system having multiple components spread over multiple time zones in accordance selected embodiments of the present disclosure.

To provide additional details for an improved understanding of selected embodiments of the present disclosure, reference is now made to FIG. 5 which depicts a simplified block diagram of a rate-based system 500 having a plurality of rate limited components 501-506 spread over different time zones which are connected to a global license allocation system 520 which will allow a user of the rate-based system to define the physical location or the time zone where each rate limited component (e.g., 501) is located, and to provide a rate peak time (e.g., peak start and end times) within the time zone for the rate limited component. Based on the user-specified information, the global license allocation system 520 is configured to programmatically allocate proportions of the rate to each part of the system, thereby optimizing the amount of license they are required to use so that a component can handle larger rates through the system during peak hours of the day (normal business hours, etc.).

To collect the information needed for allocating the license rate, a component application programmable interface (API) 512 is provided which interacts with the rate limited components 501-506 via signal messages 514 to provide a list of components along with corresponding time zone or location information for each component. For example, the global license allocation system 520 may be configured with a micro service to periodically (e.g., every minute) exchange signal messages 524 to perform an API request (e.g., a GET request from the RESTful API description language) against the Component API 512 to determine a list of components 501-506 that exist within the system 500, along with associated geographic location or time zone information. In selected embodiments, the global license allocation system 520 may use a first database table 521 as backing data storage system to store configuration metadata (e.g., system_components id, time_zone).

Using the list of components provided by the component API 512, the global license allocation system 520 may exchange signal messages 523 with a license application programmable interface (API) 511 which interacts with the rate limited components 501-506 via signal messages 513 to dynamically adjust the license rates for individual components 501-506 of the rate-based system 500. To this end, the global license allocation system 520 may submit an API request (e.g., a GET request) 523 to the license API 511 to determine the licenses allocated with each component 501-506, and then store the retrieved data as configuration metadata (e.g., license_rate id, component_id, allocated_amount) in a second database table 522 as backing data storage system. Upon gathering the total amount of licenses available within the entire system 500, the global license allocation system 520 is configured to construct a map in memory which cross-references all of the components 501-506, the time zone each component belongs to, and the license currently allocated to each component. With the memory mapped information, the global license allocation system 520 may be configured to perform license rate adjustments for each component 501-506 using an algorithm for balancing the rates across the system. If the user has specified a start and end time for high traffic times for a rate limited component (e.g., 501), then the global license allocation system 520 can use this information when making the determination of how much license to allocate at which interval. In addition, there may be "floor" and "ceiling" limit parameters set for each license rate for each time zone, or even separately for the specified high traffic times.

Figure 6:
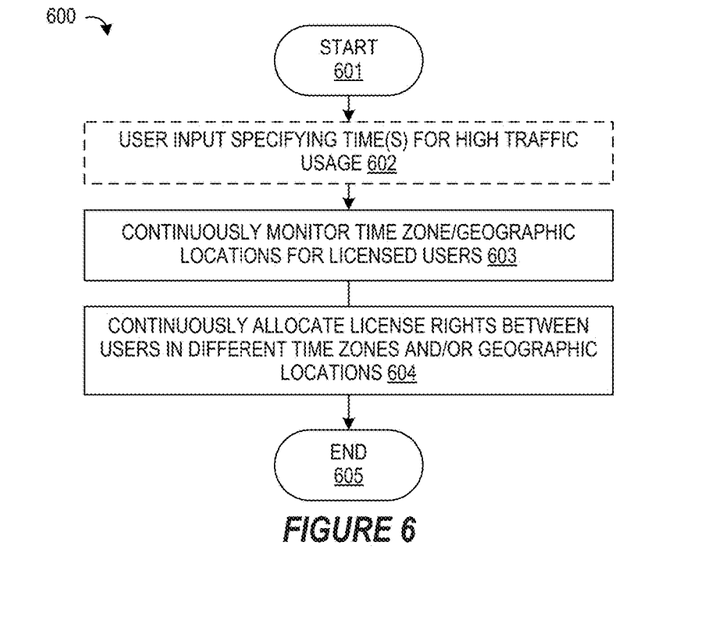
FIG. 6 depicts a first simplified flow chart showing the logic for operating a global rate-based licensing application spanning multiple time zones in accordance selected embodiments of the present disclosure.

To provide additional details for an improved understanding of selected embodiments of the present disclosure, reference is now made to FIG. 6 which depicts a simplified flow chart 600 showing the logic for operating a global rate-based licensing application (e.g., QRadar SIEM) to nodes located in multiple time zones where application usage varies over the course of the day by continuously collecting location or time zone information, peak usage time information, and license allocation information for each node (e.g., by using one or more APIs) at a central location, such as the global license allocation system 520, to adjust the license allocations for the nodes in a user organization so that the application license is being optimally used by the nodes based on peak hours for the nodes. The global rate-based licensing operation 600 is especially beneficial for systems such as the security intelligence platform 420 which executes license events based upon rate-based licenses by providing a mechanism for allocations a decentralized application license among nodes operating in multiple time zones. The processing shown in FIG. 6 may be performed by a cognitive system, such as the computer system 300, secure intelligence platform 420, or other cognitive computing system, method, or module. Wherever implemented, the disclosed rate-based system continually shifts or adjusts the allocation of licenses to be apportioned amongst a user organization's nodes based on the geographic location for each node and the amount of the license expected to be used at specified times (e.g., during peak usage times). With the disclosed system for operating a global rate-based licensing application, an information handling system can be configured to track the location of nodes and correctly allocate license rates to each node based on expected usage, thereby improving the computer operation with increased license allocation efficiency for the user organization.

In FIG. 6, the processing commences at 601 whereupon, at step 602, user input is received which specifies time range information (e.g., start and end time) for one or more high traffic usage intervals. For example, a user organization may input the rate peak time (e.g., work hours between 8 am and 5 pm each work day) within each time zone where the user's nodes will be operating. As indicated with the dashed lines, the user input at step 602 is optional, and may not be required in every embodiment. The processing at step 602 may be performed at the computer system 300, secure intelligence platform 420, or other cognitive computing system, method, or module, with the specified time information stored in one of the database tables 521-522.

At step 603, the system continuously monitors the time zone and/or geographic location information for each licensed user node. For example, a first computing system (e.g., a global license allocation system 520) may use an application programming interface to retrieve a list of rate-limited user components and corresponding geographic location information for each component. In selected embodiments, the first computing system runs a micro service to periodically determine a list of user components and current user locations that exist in the system. The processing at step 603 may be performed at the computer system 300, secure intelligence platform 420, or other cognitive computing system, method, or module, with the monitored location information stored in one of the database tables 521-522.

At step 604, the system continuously allocates license rights between user nodes in different time zones and/or geographic locations. For example, a first computing system (e.g., a global license allocation system 520) may use an application programming interface to determine the current license allocations from each rate-limited user component. In selected embodiments, the first computing system runs a micro service to periodically conduct license rate changes throughout the system by continuously shifting respective allocations of a license for a user organization across users nodes based on respective geographic locations of the user nodes and an amount of the license expected to be used during peak hours at a respective geographic location. By default, the processing at step 604 may use an algorithm to automatically balance the license allocations based on the time-varying network traffic rates, such as shown in FIG. 1 which depicts the trend of network activity of a first user in Time Zone A 101 during business hours. For example, the processing at step 604 may provide a first allocation of the license for a first geographic location during peak hours that is proportionally greater than a second allocation of the license for a second geographic location during non-peak hours, wherein the peak hours for the first geographic location occur at the same time that non-peak hours occur for the second geographic location. The processing at step 604 may be performed at the computer system 300, secure intelligence platform 420, or other cognitive computing system, method, or module, with the license allocation information stored in one of the database tables 521-522. Upon completion of step 604, the process ends (step 605), at which time the sequence of steps 602-604 may be repeated to continually monitor and adjust the license allocations.

Figure 7:
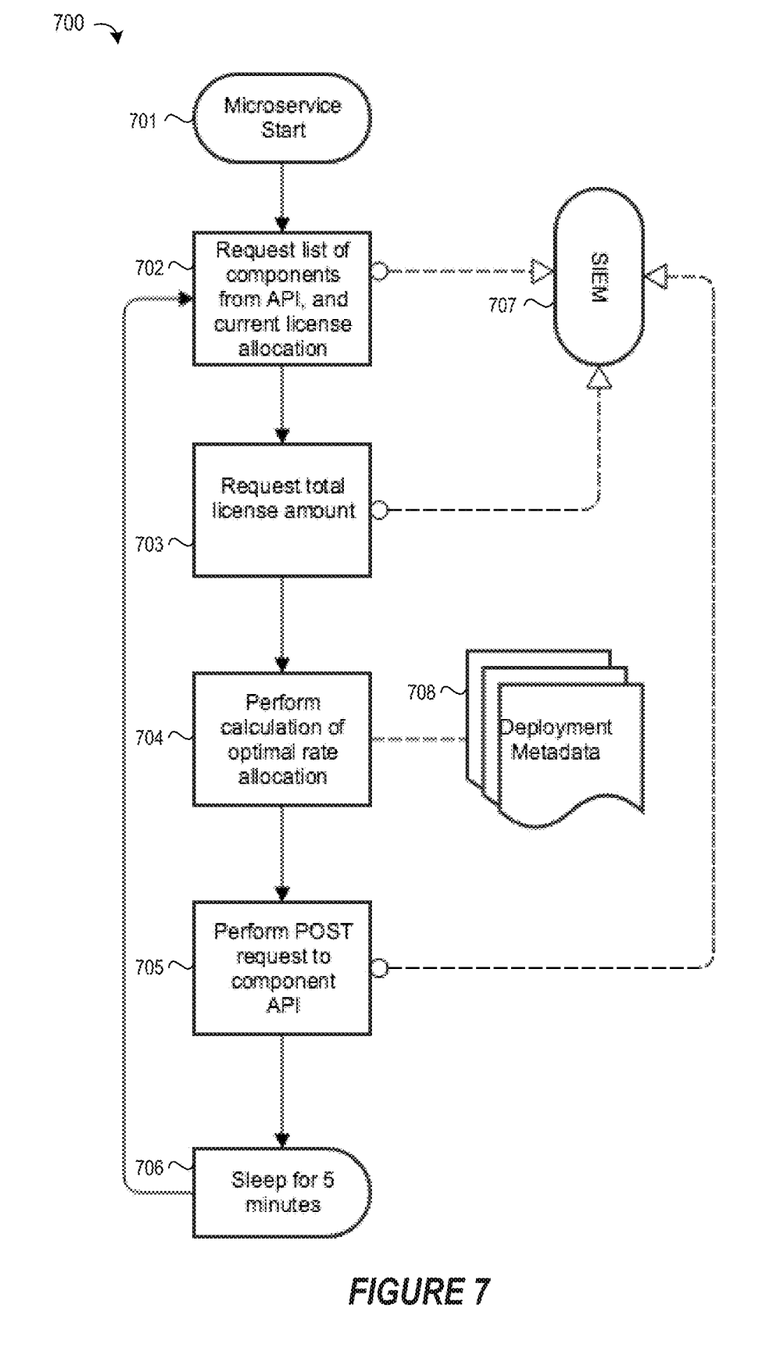
FIG. 7 depicts a second simplified flow chart showing the logic for operating a global rate-based licensing application spanning multiple time zones in accordance selected embodiments of the present disclosure.

Turning now to FIG. 7, there is depicted a simplified flow chart 700 showing the logic for operating a global rate-based licensing application spanning multiple time zones in accordance selected embodiments of the present disclosure. The processing shown in FIG. 7 may be performed by a cognitive system, such as the computer system 300, secure intelligence platform 420, or other cognitive computing system, method, or module in which the allocation of licenses is continually shifted or adjusted amongst a user organization's nodes based on the geographic location and associated time of day for each node and the amount of the license expected to be used at specified times (e.g., during peak usage times). In FIG. 7, the processing commences at 701 when a microservice starts, such as when a first computing system (e.g., a global license allocation system 520) periodically invokes a microservice according to a specified schedule or frequency. At step 702, the first computing system requests a list of components, such as by using an API (e.g., component API 512), and also retrieves the current license allocation for each component, such as by issuing a request to the security information and event management (SIEM) 707. At step 703, the first computing system requests the total license amount from the SIEM 707, and then calculates the optimal rate allocation for the identified components at step 704 based on each component's respective geographic information and associated time of day that may be retrieved from the deployment metadata 708 for each component. At step 705, the first computing system may then "post" a request to the SIEM 707 which uses the license API (e.g., license API 511) to distribute the calculated optimal rate allocation to the components. After a predetermined sleep step 706 (e.g., 5 minutes), the processing steps 702-705 are then repeated.

Selected embodiments of the present disclosure are described with reference to allocating a rate-based license for an application that is applied to user organization nodes in different time zones by evaluating location information and specified peak rate times for network traffic to continually adjust the license allocations. However, it will be appreciated that the present disclosure may be also be applied to a variety of time-varying network traffic data input information to identify optimize the license allocation among globally distributed user organization nodes. In such embodiments, a centralized global license allocation system may collect and store key configuration metadata corresponding to user node identification information, locations, time zones, license rates, and peak times that are used to balance the license rates across the system of user nodes in the system.

By now, it will be appreciated that there is disclosed herein a system, method, and apparatus in which a processor, a data bus coupled to the processor, and a computer-usable medium embodying computer program code are provided for managing a rate-based license with instructions executable by the processor and configured for monitoring geographic location information for each of a plurality of users in different time zones to identify a current time of day for each of the plurality of users. The computer program code may also include instructions executable by the processor and configured to execute a first application programming interface to retrieve a list of user components in different time zones and geographic location information for each user component on the list. In addition, the computer program code may also include instructions executable by the processor and configured to enable a user to specify one or more peak hours at each geographic location. In addition, the executable instructions are configured for adjusting allocations of an application license for a user organization across the plurality of users based on the corresponding geographic location information and/or corresponding current time of day for each of the plurality of users and an amount of the application license expected to be used during specified peak hours at each geographic location so that the application license is allocated to license each user during the specified peak hours at each geographic location without exceeding a total license amount under the application license. In selected embodiments, the process for adjusting allocations of the application license may include shifting allocations of the application license according to the list of user components and their respective geographical locations. In such embodiments, the computer program code may also include instructions executable by the processor that are configured to execute a second application programming interface to dynamically adjust the application license based on the shifting allocations. The process for adjusting allocations of the application license may include setting first and second license allocations, where the first license allocation for a first geographic location during specified peak hours for a first geographic location is proportionally greater than a second license allocation for a second geographic location during specified non-peak hours, wherein the specified peak hours for the first geographic location and the specified non-peak hours for the second geographic location occur at the same time. In selected embodiments, the application license is not centralized, and is applied to multiple user nodes (e.g., event processors) located in different time zones so that each user node may execute a plurality of events on a security platform based upon a rate-based license between said user and a security platform provider.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A system comprising a processor, a data bus coupled to the processor, and a computer-usable medium embodying computer program code, the computer-usable medium being coupled to the data bus, the computer program code used for managing a rate-based license and comprising instructions executable by the processor and configured for:
monitoring geographic location information for each of a plurality of users in different time zones to identify a current time of day for each of the plurality of users; and
adjusting allocations of an application license for a user organization across the plurality of users based on the corresponding current time of day for each of the plurality of users and an amount of the application license expected to be used during specified peak hours at each geographic location so that the application license is allocated to license each user during the specified peak hours at each geographic location without exceeding a total license amount under the application license.

2. The system of claim 1, where the application license is not centralized.

3. The system of claim 1, where each user executes a plurality of events on a security platform based upon a rate-based license between said user and a security platform provider.

4. The system of claim 1, where the computer program code further comprises instructions executable by the processor and configured to enable a user to specify one or more peak hours at each geographic location.

5. The system of claim 1, where adjusting allocations of the application license comprises setting first and second license allocations, where the first license allocation for a first geographic location during specified peak hours for a first geographic location is proportionally greater than a second license allocation for a second geographic location during specified non-peak hours, wherein the specified peak hours for the first geographic location and the specified non-peak hours for the second geographic location occur at the same time.

6. The system of claim 1, where the computer program code further comprises instructions executable by the processor and configured to execute a first application programming interface to retrieve a list of user components in different time zones and geographic location information for each user component on the list.

7. The system of claim 6, where adjusting allocations of the application license comprises shifting allocations of the application license according to the list of user components and their respective geographical locations.

8. The system of claim 7, where the computer program code further comprises instructions executable by the processor and configured to execute a second application programming interface to dynamically adjust the application license based on the shifting allocations.

9. An information handling system comprising:
one or more processors;
a memory coupled to at least one of the processors;
a set of instructions stored in the memory and executed by at least one of the processors to manage a rate-based license, wherein the set of instructions are executable to:
monitor, by the system, geographic location information for each of a plurality of users in different time zones to identify a current time of day for each of the plurality of users; and
adjust, by the system, allocations of an application license for a user organization across the plurality of users based on the corresponding current time of day for each of the plurality of users and an amount of the application license expected to be used during specified peak hours at each geographic location so that the application license is allocated to license each user during the specified peak hours at each geographic location without exceeding a total license amount under the application license.

10. The information handling system of claim 9, where each user executes a plurality of events on a security platform based upon the application license between said user and a security platform provider, where the application license is a non-centralized rate based license.

11. The information handling system of claim 9, wherein the set of instructions are executable to enable a user to specify one or more peak hours at each geographic location.

12. The information handling system of claim 9, wherein the set of instructions are executable to adjust allocations of the application license by setting first and second license allocations, where the first license allocation for a first geographic location during specified peak hours for a first geographic location is proportionally greater than a second license allocation for a second geographic location during specified non-peak hours, wherein the specified peak hours for the first geographic location and the specified non-peak hours for the second geographic location occur at the same time.

13. The information handling system of claim 9, wherein the set of instructions are executable to execute a first application programming interface to retrieve a list of user components in different time zones and geographic location information for each user component on the list.

14. The information handling system of claim 13, wherein the set of instructions are executable to adjust allocations of the application license by shifting allocations of the application license according to the list of user components and their respective geographical locations.

15. The information handling system of claim 14, wherein the set of instructions are executable to execute a second application programming interface to dynamically adjust the application license based on the shifting allocations.

16. A computer program product stored in a computer readable storage medium, comprising computer instructions that, when executed by an information handling system, causes the system to manage a rate-based license by performing actions comprising:
monitoring, by the system, geographic location information for each of a plurality of users in different time zones to identify a current time of day for each of the plurality of users, where each user executes a plurality of events on a security platform based upon an application license between said user and a security platform provider, where the application license is not centralized; and adjusting, by the system, allocations of the application license for a user organization across the plurality of users based on the corresponding current time of day for each of the plurality of users and an amount of the application license expected to be used during specified peak hours at each geographic location so that the application license is allocated to license each user during the specified peak hours at each geographic location without exceeding a total license amount under the application license.

17. The computer program product of claim 16, further comprising computer instructions that, when executed by the information handling system, causes the system to perform actions comprising enabling a user to specify one or more peak hours at each geographic location.

18. The computer program product of claim 16, where adjusting allocations of the application license comprises setting first and second license allocations, where the first license allocation for a first geographic location during specified peak hours for a first geographic location is proportionally greater than a second license allocation for a second geographic location during specified non-peak hours, wherein the specified peak hours for the first geographic location and the specified non-peak hours for the second geographic location occur at the same time.

19. The computer program product of claim 16, further comprising computer instructions that, when executed by the information handling system, causes the system to perform actions comprising executing a first application programming interface to retrieve a list of user components in different time zones and geographic location information for each user component on the list.

20. The computer program product of claim 19, further comprising computer instructions that, when executed by the information handling system, causes the system to perform actions comprising:

adjusting allocations of the application license by shifting allocations of the application license according to the list of user components and their respective geographical locations; and executing a second application programming interface to dynamically adjust the application license based on the shifting allocations.

\* \* \* \* \*